United States Patent [19]

Giusti

[11] 4,262,095

[45] Apr. 14, 1981

[54] THREE-BLOCK COPOLYMERS AND METHOD FOR PRODUCING THEM

[75] Inventor: Paolo Giusti, Pisa, Italy

[73] Assignee: Anic S.p.A., Palermo, Italy

[21] Appl. No.: 964,459

[22] Filed: Nov. 29, 1978

[30] Foreign Application Priority Data

Dec. 20, 1977 [IT] Italy ............................... 30946 A/77

[51] Int. Cl.$^3$ ............................................ C08F 297/00
[52] U.S. Cl. .................................... 525/249; 525/244; 525/319; 525/367
[58] Field of Search .................... 260/878 B; 525/249, 525/267, 319

[56] References Cited

U.S. PATENT DOCUMENTS

| | | | |
|---|---|---|---|
| 3,265,765 | 8/1966 | Holden et al. | 260/876 |
| 3,649,579 | 3/1972 | Gobran et al. | 260/27 |
| 3,699,190 | 10/1972 | Shimomura | 260/877 |
| 3,911,054 | 10/1975 | Roest et al. | 260/880 B |
| 3,980,736 | 9/1976 | Agouri et al. | 260/876 B |
| 4,088,813 | 5/1978 | Willis | 260/878 B |

*Primary Examiner*—Carman J. Seccuro

[57] ABSTRACT

Three-block copolymers of the ABA and ABC type are disclosed in which A and C are plastomeric monomers and B is an elastomeric polymer are disclosed, which are prepared by first polymerizing the block A in such a way to keep alive the active centers in the chain ends for a time sufficient to permit the addition of the second monomer B, whereafter, with the aid of a special catalytic system, the growth of the third block C, can be carried out. A and C are mutually interchangeable. The catalyst for polymerizing the block A is a Lewis' acid aided by isobutene and the catalyst for introducing and copolymerizing C (or A) is a chloride of aluminium alkyl.

7 Claims, No Drawings

THREE-BLOCK COPOLYMERS AND METHOD FOR PRODUCING THEM

This invention relates to a novel class of three-block copolymers of the type ABA and ABC wherein the blocks A and C are of a plastomeric nature and the block B is of an elastomeric nature.

This invention, moreover, has as its object to provide a process by which such three-block copolymers can be obtained.

The fields of use of the three-block copolymers of this invention are those which are typical of the thermoplastic elastomers.

The elastomeric properties of these copolymers are due to the immiscibility of the polymer which make up the blocks A, or C, with those of the block B. Thus, a two-base structure is generated in the material and, in such a structure, the plastomeric domains A and C play the roles of cross-linking agents which reinforce the elastomeric matrix which forms the central block.

As a result, the copolymer such as ABA, or ABC, behaves, at room temperature, like a vulcanized rubber. By heating such a material above the vitreous-transition temperature (in the case of an amorphous polymer) or above the melting point temperature (in the case of crystalline polymer) of the plastomeric phase (A or C), the material behaves like the conventional thermoplastics materials and can thus be processed according to the procedures which are commonly adopted for such materials.

The rigid domains are formed upon the successive cooling again and the material acquires its elastomeric properties anew. The advantages of a thermoplastic elastomer over the conventional rubbers are apparent: spent articles can be processed again, scraps are prevented, rejects are no longer experienced and the result is the preservation of both the resources and the environment.

A few thermoplastic elastomers, which are obtained by means of ionic polymerization processes, have been introduced in the market in the "seventies" as products obtained by anionic procedures and in these products the central block is generally polybutadiene, or polyisoprene, variously substituted.

Materials of such a nature, on account of the unsaturation which is present in the elastomeric phase, exhibit a poor resistance to oxidation and ageing and must be stabilized by using additives just as it occurs with the conventional rubbers.

The three-block copolymers according to this invention afford the outstanding advantage that they have an elastomeric phase which is composed by a saturated polymer, so that they are inherently resistant to oxidation, that is to say, to ageing. It has been surprisingly ascertained, in fact, that a thermoplastic elastomer can be synthesized by a single polymerization run through a cationic-type catalysis, by exploiting, in order to form an elastomeric block, isobutylene, which, as is known, originates a saturated elastomer.

The process comprises the steps of polymerizing at the outset, the monomer which originates the plastomeric-type block A under such conditions as to keep "alive" the active centres at the ends of the growing chains for a time which is long enough to permit the addition of the second monomer (isobutene) to the system, said second monomer being capable of originating the B-type elastomeric block. By working under normal conditions, when the second monomer in its entirety has originated the B-type elastomeric block, a two-block, AB-type copolymer comes into existence and, as a rule, it is not adapted to behave as an active centre for the growth of the third block, either of the A-type or the C-type.

The adoption of the catalytic system of the present invention permits, however, that in the intermediate stage a two-block, AB-type polymeric species may be obtained, which possesses, at the end of the B-block, an appropriate functional group which is capable, in the presence of a new catalytic agent which is added together with the last polymer batch, of providing a new active centre. On this latter, the growth of the third block, either of the A-type or the C-type, can take place.

The compounds which can be used for producing the blocks of the types A and C are those conventionally used for obtaining plastomers by adopting cationic-type polymerizations. They are, consequently, those having in their molecules at least one unsaturation and this can be, preferably but not compulsorily, an olefinic unsaturation. Thus, they can be selected from among the class of the unsaturated hydrocarbons which contain the olefinic unsaturation in their chain and which possibly exhibit substituents composed by hydrocarbonaceous, saturated, cyclic or aromatic radicals. The compounds of the class as defined above, which essentially comprised of carbon and hydrogen, may also exhibit different atoms, such as oxygen atoms (benzofuran, anethole), nitrogen atoms (vinyl carbazol) and many others.

The preferred compounds can be selected from among those having up to 20 carbon atoms.

The compounds which can be used for the production of the B elastomeric block are, in addition to isobutylene, all those monomers which are polymerized with a cationic mechanism, giving rise to a saturated polymer having an elastomeric nature (such as vinyl ethers).

The solvents to be employed are those which are generally used in the production of butyl-rubber, that is, ethyl chloride or methyl chloride, methylene chloride and others. It is possible, however, to use also hydrocarbonaceous solvents which are liquid at the reaction temperature, such as pentane, isopentane, nor.heptane, cyclohexane, methylcyclohexane and others, or also solvents which are maintained in the liquid state at the reaction temperature, such as the monomers themselves or any of them.

As regards the catalytic system for the polymerization of the first plastomeric block, there can be used boron halides or aluminium halides in the presence of cocatalytic amounts of isobutylene.

For the polymerization of the second plastomeric block, a compound should be used having the formula $AlR_2X$, wherein R is a hydrogen atom or a hydrocarbonaceous radical having up to 8 carbon atoms, X is equal to R or is a halogen, such as Br, Cl, F and I.

The most interesting result from an industrial standpoint have been obtained by using styrene, isobutene and p.dimethylstyrene as the monomers for originating the blocks A, B and C, respectively, and methylene chloride as the solvent, aluminium trichloride and aluminium diethyl monochloride being used as initiators.

Reference is made to these compounds, without intending thereby to limit the invention to them, in the ensuing description of the stages of the process of polymerization claimed herein.

To a solution of styrene in methylene chloride, which is maintained at a temperature in the range from −20° C. to −80° C., the preferred range being from −30° C. to −60° C., there is added first the aluminium trichloride and no formation of polymer is observed.

The addition of isobutene in co-catalytic amounts causes the polymerization of the styrene with conversions which are virtually as high as 100%. By adding at the end of the polymerization run of styrene an appropriate amount of isobutene, also the complete polymerization of the latter monomer can be experienced. Complete analyses of the product obtained up to this stage have shown that it is a two-block, AB-type copolymer which has, at the end of the B-block a chlorine atom, small values of homopolymers of the types A and B being also present.

If there are added to the reaction system catalytic amounts of aluminium diethyl monochloride and, subsequently, styrene (or p.dimethyl styrene), the complete polymerization of the latter amount of monomer is experienced the three-block copolymer of the ABA-type (or ABC-type) being thereby formed.

The polymers as obtained according to the procedure outlined above have been analyzed by extraction in a Soxhlet apparatus, multiple extractions being carried out with different solvents, as described in the literature: J. P. Kennedy et al., J. Macromol. Sci., A9 (5), 833 (1975). The first extraction has been made with methyl ethyl ketone (MEK) which is a good solvent for the polystyrene phase and the subsequent extractions have been carried out with nor. alkanes (nor.pentane and/or higher homologs) which are good solvents for the polyisobutylene phase.

The various polymers have been identified by determining the mol wt (viscosimetrically, as described hereinafter) and the structure (differential thermal analysis, DSC and Infra-Red Spectroscopy).

The mol wts (viscosimetrically), Mv have been obtained, since the intrinsic viscosity $[\eta]$ has been determined on solutions of the polymers in toluene at 30° C., on the basis of the following equation:

$$\ln Mv = 1.46 \ln [\eta] + 12.794$$

By these determinations it has been ascertained that the polymers obtained according to the present invention are essentially three-block copolymers, of the type ABA or ABC.

The ensuing examples are intended better to illustrate the invention without limiting it. It has been deemed fitting to illustrate the invention with reference to the particular case of the preparation of thermoplastic elastomers styrene-isobutene-styrene, and styrene-isobutene-p.dimethylstyrene, on account of their importance from an industrial standpoint. Logically enough, on the basis of these examples and also of the foregoing disclosure, anyone skilled in the art is in a position to carry out a number of modifications and applications of the invention without departing therefrom.

EXAMPLE 1

An adiabatic calorimeter is used, which is entirely made of glass and is equipped with a magnetic stirrer, a platinum wire thermometer and a conductivity cell, both connected to a two-channel recorder. The calorimeter is connected to a vacuum main by means of which it is both dried and deaerated.

The apparatus is charged, in the order given, with 120 mls of $CH_2Cl_2$, 0.711 g of styrene (0.057 mol/liter) and 1.9 g of $AlCl_3$ ($1.2 \cdot 10^{-4}$ mol/liter), the temperature being maintained at −45° C.

There subsequently added to the reaction mixture, with vigorous stirring, 0.1 ml of isobutylene equivalent to 60 mg ($8.9 \cdot 10^{-3}$ mol/liter). 5 minutes after such addition, as soon as the temperature of the reaction mixture which had risen due to the polymerization of the styrene, has been stabilized to −45° C. again, 0.480 additional grams of isobutylene are distilled in the reactor (0.0714 mol/liter). Stirring is continued for 10 mins as from the completion of the addition, whereafter the reaction is discontinued by adding methanol to the reaction mixture.

There are obtained, upon precipitation in methanol, 1.24 g of dry polymer (yield 99%) after that the polymer has been subjected to fractionation by multiple extractions in a Soxhlet apparatus. The weight of the fraction which appeared to be soluble first in MEK (first extraction) and then in nor.pentane (subsequent extractions) is composed in its entirety by a copolymer of the AB-type and is 0/780 g equivalent to a yield of 62.4% and has a $[\eta] = 0.14$ dl/g as determined in toluene at 30° C., which corresponds to an average viscosimetric mol wt of 21,000.

The sample which has been obtained is subjected to Infra Red analysis and the spectrum shows all the characteristic absorptions of polystyrene and polyisobutene and is very similar to the spectrum obtained starting from a mixture of the two homopolymers and does not differ very much from the spectrum of a random copolymer having the same composition. On the other hand, the procedure employed in the fractionation excludes the possibility that the fraction is composed by a mixture of the two homopolymers and, in addition, the polymerization kinetics clearly shows that the sample cannot be a random polymer, since isobutene is added when all the styrene has been polymerized.

This copolymer, when subjected to DSC analysis exhibits two glassy transitions: one at about −65° C. and one at about +85° C. The first transition can be associated to the polyisobutene blocks. The slight defference observed between the observed Tg and the reported one (Polymer Handbook, Second Edition, J. Brandrup E.H. Immergut Editors, John Wiley and Sons, Inc. New York, 1975, Chapter III) for polyisobutene (+73° C.) can be attributed to possible differences in the measurement procedures and also to the presence of a few styrene units in the elastomeric blocks and also to inter- or intramolecular interactions between the elastomeric and the plastomeric blocks of the AB copolymer.

The second transition can clearly be attributed to the polystyrene blocks even if it is slightly lower than that reported for polystyrene (100° C.). The seeming discrepancy can be explained with arguments which are quite similar to those set forth above, especially on considering that polymerization is carried out with a small catalytic quantity of isobutene being present.

EXAMPLE 2

An apparatus is used which is quite similar to that described in EXAMPLE 1.

The apparatus is charged with 120 mls of $CH_2Cl_2$ and 1.356 g of styrene (0.1087 mol/liter) and then with 2.5 mg of $AlCl_3$ ($1.6 \cdot 10^{-4}$ mol/liter), the temperature being maintained at −45° C. To the reaction mixture there are subsequently added with vigorous stirring 60 mg of isobutene (8.9.10$^{-3}$ mol/liter). On completion of such addition, it is awaited that, on completion of the polymerization of styrene, the temperature is restored to −45° C. again. There are then added into the reactor 0.705 g of isobutene (0.015 mol/liter) and, as soon as also this monomer is completely polymerized, 12.1 mg of AlEt$_2$Cl (8.44 . 10$^{-4}$ mol/liter) are added and, again, 1.356 g of styrene (0.1087 mol/liter).

Stirring is continued 10 minutes after the completion of the last addition, then the reaction is discontinued by introduction of methanol.

There are obtained 3.28 g of dry polymer (yield =96%) which has a [η] of 0.20 dl/g, determined in toluene at 30° C., which corresponds to an average viscometric mol wt of about 35,000. The polymer is subjected to fractionation in an extraction apparatus according to the procedure reported for EXAMPLE 1. It has been found that the total weight of the soluble fractions, first in MEK and then in nor.pentane, are predominantly composed by ABA copolyer and is 2.788 g equivalent to a yield of 85% on the total polymer.

These fractions have been subjected to Infra Red analysis and a spectrun has been obtained which exhibited the absorption which are characteristic for polystyrene and polyisobutene with different heights of the relative peaks, thus indicating a higher contents of styrene units, that which is consistent with a three-block nature of the polymer.

The DSC plot of the as-obtained polymer is qualitatively similar to that obtained with the copolymer of EXAMPLE 1, the difference being a slight rise of the glassy transition of the elastomeric blocks and that of the polystyrene blocks, which virtually coincides with that of the polystyrene homopolymer. These differences, and the fact that the molecular weight is considerably higher than that of the product of EXAMPLE 1 are a confirmation of the fact that the product is composed by a three-block copolymer.

EXAMPLE 3

A reactor made completely of glass and having a capacity of 300 mls, which is equipped with a mechanical stirrer and a thermometric jacket has been previously dried by heating it under a stream of dry argon and has been maintained, during the performance of the test, under a slight overpressure of argon (20–30 torr in excess of atmospherical pressure).

Said apparatus is charged with 120 mls of CH$_2$Cl$_2$, 7.10 g of styrene and 13.35 mg of AlCl$_3$, the temperature being maintained at −45° C. by a thermostatic bath.

To the reaction mixture are added, subsequently, with vigorous stirring, 0.2 g of isobutene.

5 minutes as from said addition, when the temperature, which meanwhile had risen, has been stabilized at −45° C. again, the reactor is charged with 5 additional grams of isobutene. The polymerization of the latter monomer is completed in 3 mins and there are then added 12 mg of AlEt$_2$Cl and then 7.1 additional grams of styrene. ring is continued for 10 minutes as from the completion of such addition, whereafter the reaction is discontinued by addition of methanol. There are obtained 19 g of dry polymer (yield 98%), which are subjected to fractionation according to the procedure already described for EXAMPLE 1. The total weight of the fraction soluble first in MEK and then in nor.pentane is 15.7 grams (yield on the total 83%). The copolymer thus obtained has a [η]=0.62 dl/g as determined in toluene at 30° C, which corresponds to an average viscometric mol wt equal to 180,000.

The sample has been identified by Infra Red analysis and DSC and has shown characteristics which are entirely similar to those of the polymer obtained according to Example 2.

The product has shown a mol wt which is higher due to the lesser "wall effect" of the reactor.

EXAMPLE 4

The test reported in EXAMPLE 3 has been repeated with the difference that p.dimethylstyrene is used instead of styrene in the last addition. The weight of this monomer is 7.5 g. There are obtained 19 g of dry polymer with a yield of about 96%. The polymer is subjected to fractionation as already described in the previous EXAMPLES and the total weight of the fractions which are soluble first in MEK and then in nor.pentane, which contain the ABC copolymer, is equal to 15.5 g (with a yield on the total equal to 82%). The same shows a [η]==0.57 dl/g corresponding to a mol wt (viscometric average) of 160,000.

The Infra Red analysis of the as obtained product has been made and a spectrum has been obtained which exhibits all the characteristic absorptions of polystyrene, of polyisobutene and of poly-p.dimethylstyrene, which is very much similar to that obtained from a mixture of the three copolymers.

On account of the procedure used for polymerization (successive batches) and of the isolation of the various fractions of the polymers the existence can be excluded both of random terpolymers and of admixed portions of pure homopolymers of the individual monomers.

The DSC analysis of the as obtained copolymer has given three glassy transition points: −65° C. (polyisobutene), +94° C. (polystyrene) and +176° C., the latter being attributable to poly-p.dimethyl styrene, in agreement with the data reported by the literature : R. W. Lentz et al., Makromol. Chem., 177, 653 (76).

EXAMPLE 5

The test described in EXAMPLE 4 is repeated, the only difference being that the temperature has been maintained at −30° C. There are obtained 17.8 g of dry polymer (yield about 94%) which are subjected to fractionation as described above. The fractions which are soluble first in MEK and then in nor.pentane (obtained with a yield of 83% on the total) are composed by a 3-block copolymer of polystyrene-polyisobutylene-p.dimethyl styrene having properties wholly similar to those of the product descirbed in EXAMPLE 4, but having a [η]=0.53 dl/g, which corresponds to a mol wt of 142,000.

I claim:

1. A process for the preparation of three-block copolymers of the type ABA or ABC wherein A and C represent polymeric blocks of homopolymers of styrene or substituted styrene and B represents blocks of polymers of polyisobutylene, said process being carried out in a single reactor at a temperature of from −80° C. to −20° C. by:
   (a) polymerizing a monomer of block A in the presence of a catalyst which is a Lewis acid united to co-catalytic amounts of isobutene,
   (b) adding the monomer of block B on completion of the polymerization of block A until the block is completely polymerized, and (c) adding and polymerizing the monomer of the block C by catalytic action of a compound having the formula $AlR_2X$, wherein R is a hydrogen atom or a hydrocarbonaceous radical of up to 8 carbon atoms, and wherein X is the same as R or is a halogen atom.

2. A process as claimed in claim 1 wherein said Lewis acid is $AlCl_3$.

3. A process as claimed in any one of the claims 1 and 10 wherein the compound having the formula $AlR_2X$ is aluminum diethyl momochloride.

4. A process as claimed in any one of claims 1 and 10 wherein said temperature is from $-60°$ C. to $-30°$ C.

5. A process as claimed in claim 2 wherein said temperature is from $-60°$ C. to $-30°$ C.

6. A process as claimed in claim 9 wherein block A is polystyrene and block C is polydimethylstyrene.

7. A three block copolymer made according to the process claimed in any of claims 1, 2 and 6.

* * * * *